United States Patent [19]
Krech, Jr.

[11] Patent Number: 6,057,852
[45] Date of Patent: May 2, 2000

[54] GRAPHICS ACCELERATOR WITH CONSTANT COLOR IDENTIFIER

[75] Inventor: Alan S. Krech, Jr., Fort Collins, Colo.

[73] Assignee: Hewlett-Packard Company, Palo Alto, Calif.

[21] Appl. No.: 08/846,359

[22] Filed: Apr. 30, 1997

[51] Int. Cl.[7] .............................. G09G 5/02; G06T 11/40
[52] U.S. Cl. ..................... 345/431; 345/522; 345/506
[58] Field of Search ................................. 345/431, 522, 345/502, 505, 506, 429

[56] References Cited

U.S. PATENT DOCUMENTS

| | | | |
|---|---|---|---|
| 5,155,822 | 10/1992 | Doyle et al. | 364/236 |
| 5,483,627 | 1/1996 | Silverbrook | 345/502 |
| 5,485,559 | 1/1996 | Sakaibara et al. | 345/550 |
| 5,720,019 | 2/1998 | Koss et al. | 345/118 |
| 5,798,770 | 8/1998 | Baldwin | 345/509 |
| 5,801,711 | 9/1998 | Koss et al. | 345/441 |
| 5,815,166 | 9/1998 | Baldwin et al. | 345/506 |
| 5,821,949 | 10/1998 | Deering | 345/505 |
| 5,821,950 | 10/1998 | Rentschler et al. | 345/505 |
| 5,933,578 | 8/1999 | Capelle et al. | 358/501 |
| 5,982,399 | 11/1999 | Scully et al. | 345/522 |
| 5,990,904 | 9/1998 | Griffin et al. | 345/426 |
| 6,005,580 | 12/1999 | Donovan et al. | 345/430 |

*Primary Examiner*—Mark K. Zimmerman
*Assistant Examiner*—Thomas J. Joseph

[57] ABSTRACT

The present invention is directed to a method that enhances the performance of a geometry accelerator. In accordance with one aspect of the invention, the method comprises the step of receiving a color command from an application program interface (API), the color command identifying a first color for a primitive vertex. Thereafter, the invention initializes a count and receives a primitive element to draw on a screen in the first color. Then, the invention increments a count. The method further comprises the step of operating on the primitive element by a lighting machine and a plane equation machine, and repeating the steps of incrementing the count and operating on the primitive element until a specified count has been reached. Then, once the specified count has been reached, the invention operates on the primitive element without invoking either the lighting or plane equation machines., until a color command is received that specifies a second color for a primitive vertex.

8 Claims, 7 Drawing Sheets

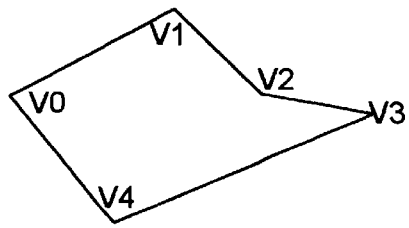
Line Loop
FIG. 5A
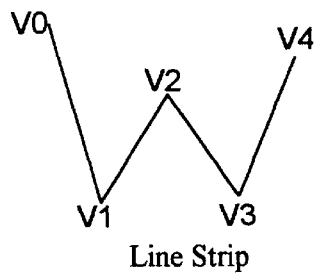
Line Strip
FIG. 5B
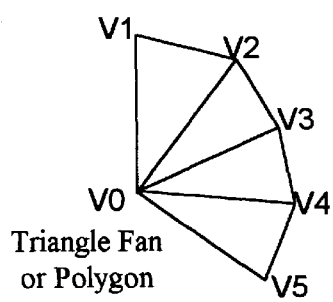
Triangle Fan
or Polygon
FIG. 5C
| V0 | V2 | V4 | V6 |
|----|----|----|----|
| V1 | V3 | V5 | V7 |
Quad Mesh or
Quad Strip
FIG. 5D
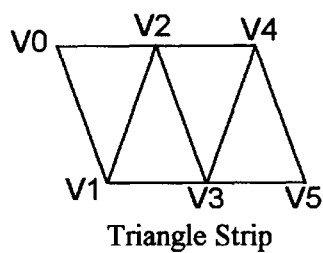
Triangle Strip
FIG. 5E

GRAPHICS ACCELERATOR WITH CONSTANT COLOR IDENTIFIER

BACKGROUND OF THE INVENTION

1. Field of the Invention

The present invention relates to computer graphics systems and, more particularly, to a computer graphics system utilizing a graphics accelerator having an enhanced logic and register structure to achieve enhanced performance.

2. Discussion of the Related Art

Computer graphics systems are commonly used for displaying graphical representations of objects on a two-dimensional video display screen. Current computer graphics display systems provide highly detailed representations and are used in a variety of applications. A computer graphics display system generally comprises a central processing unit (CPU), system memory, a graphics machine and a video display screen.

In typical computer graphics display systems, an object to be presented on the display screen is broken down into graphics primitives. Primitives are basic components of a graphics display and may include points, lines, vectors and polygons (e.g., triangles and quadrilaterals). Typically, a hardware/software scheme is implemented to render, or draw, the graphics primitives that represent a view of one or more objects being represented on the display screen.

Generally, the primitives of the three-dimensional object to be rendered are defined by the host CPU in terms of primitive data. For example, when the primitive is a triangle, the host computer may define the primitive in terms of the X, Y and Z coordinates of its vertices, as well as in terms of the red, green, blue and alpha (R, G, B and α) color values of each vertex. Alpha is a transparency value. Additional primitive data may be used in specific applications. Rendering hardware interpolates the primitive data to compute the display screen pixels that represent each primitive, and the R, G, B and α values for each pixel.

The graphics machine generally includes a geometry accelerator, a rasterizer, a frame buffer controller and a frame buffer. The graphics machine may also include texture mapping hardware. The geometry accelerator receives vertex data from the host CPU that defines the primitives that make up the view to be displayed. The geometry accelerator typically comprises a transform component which receives vertex data from the CPU, a clipping component, an illumination component, and a plane equations component. The transform component performs transformations on the vertex data received from the CPU, such as rotation and translation of the image space defined by vertex data. The clipping component clips the vertex data so that only vertex data relating to primitives that make up the portion of the view that will be seen by the user is kept for further processing. The illumination or lighting component calculates the final colors of the vertices of the primitives based on the vertex data and based on lighting conditions. The plane equations component generates floating point equations which define the image space within the vertices. The floating point equations are later converted into fixed point equations and the rasterizer and texture mapping hardware generate the final screen coordinate and color data for each pixel in each primitive.

The operations of the geometry accelerator are computationally very intense. One frame of a three-dimensional (3-D) graphics display may include on the order of hundreds of thousands of primitives. To achieve state-of-the-art performance, the geometry accelerator may be required to perform several hundred million floating point calculations per second. Furthermore, the volume of data transferred between the host computer and the graphics hardware is very large. Additional data transmitted from the host computer to the geometry accelerator includes illumination parameters, clipping parameters and any other parameters needed to generate the graphics display.

Various techniques have been employed to improve the performance of geometry accelerators. These including pipelining, parallel processing, reducing redundance, minimizing computations, etc. in a graphics accelerator. For example, conventional graphic systems are known to distribute the vertex data to the geometry accelerators in a manner that results in a non-uniform loading of the geometry accelerators. This variability in geometry accelerator utilization results in periods of time when one or more geometry accelerators are not processing vertex data when they are capable of doing so. Since the throughput of the graphics system is dependent upon the efficiency of the geometry accelerators, this inefficient use of the processing capabilities decreases the efficiency of the graphics system. In response to this shortcoming in the prior art, a solution was developed for distributing "chunks' of data to a parallel arrangement of geometry accelerators.

Another way of improving the throughput of a geometry accelerator is to minimize the overall amount of data that must be processed by it. For example, this can be done by minimizing redundancy in the data being sent to the geometry accelerator. Application program interfaces (APIs) are known to reduce redundant data sent to the geometry accelerator by identifying a "constant color" mode of operation. As is known, APIs generally interface higher-level software to hardware. In a specific area, APIs are known to interface software graphic routines coded, for example, in C programming language, to graphic hardware devices, such as a graphics accelerator.

To more particularly describe the identification of a constant color mode of operation, some APIs require the higher-level, programming software to include a color command associated with each primitive, or primitive vertex. Since a color command is associated with each primitive, or primitive vertex, it is a relatively straight-forward task to identify a constant color mode of operation. Namely, by identifying repeated use of the same color. Thereafter, the graphics API may implement a minimization of the parameters or information that it sends to the geometry accelerator.

Certain APIs are known to provide vertex programming modes. These modes indicated the type and quantity of data that is presented to the hardware for each vertex. For example, all vertices in a particular group might include X, Y, and Z data, while others might include X, Y, Z, and red, green, and blue (RGB) color data. However, all vertices in a given group are alike, insofar as all either have RGB data or none have RGB data. If no color data is present, this limitation permits hardware to easily identify a constant color mode and thus increase system performance by not computing slope information.

However, other graphic APIs do not require such a color command to be associated with the drawing instruction/command. For example, OpenGL is a widely used graphics API, which is rapidly becoming an industry standard. OpenGL offers a robust, yet flexible, programming interface, and does not require a programmer to include a color command with each graphic primitive. Instead, a color command need only be provided upon invoking a color change. Moreover, OpenGL provides two separate color commands: a "glColor3" command and a "glColor4" command. The glColor3 command includes parameters for the red, green, and blue (RGB) color components, and the α value defaults to 1 (no transparency). The glColor4 command includes parameters that not only specify the R, G, and B components, but also the α component.

In a graphics program coded in OpenGL, or any other graphics API that does not provide for the identification of a constant color mode, excessive graphics data/information is sent to the geometry accelerator. Processing this redundant information consumes an excessive amount of time and resources. For example, suppose a graphic program is drawing a picture of an automobile on the system display. The body of the automobile may be a uniform color, and yet may require thousands of graphic primitives to draw. If the geometry accelerator chip processes each primitive color independently, excessive time and resource allocation is required (e.g., calculations in the lighting machine and the plane equations for the primitive's color).

However, identification of such a "constant color" mode is not a trivial task. Since the geometry may receive a variety of graphic primitive types (e.g., vertices, line segments, triangle, quadrilaterals, triangle fans, triangle strips, etc.), the determination of whether or not to calculate plane equations for successive primitives/vertices is a difficult determination to make. Further complicating this determination within a geometry accelerator chip, as opposed to within the API, is the fact that some systems employ a plurality of geometry accelerator chips operating in parallel. If successive graphic primitives are processed by a different geometry accelerator, determination by a given geometry accelerator of whether or not to compute plane equation calculations, is a difficult determination to make.

SUMMARY OF THE INVENTION

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the advantages and novel features, the present invention is generally directed to a method for enhancing the performance of a geometry accelerator. In accordance with one aspect of the invention, the method comprises the step of receiving a color command from an application program interface (API), the color command identifying a first color for a primitive vertex. Thereafter, the invention initializes a count and receives a primitive element to draw on a screen in the first color. Then, the invention increments a count. The method further comprises the step of operating on the primitive element by a lighting machine and a plane equation machine, and repeating the steps of incrementing the count and operating on primitive elements until a specified count has been reached. Then, once the specified count has been reached, the invention operates on further primitive elements without invoking either the lighting or plane equation machines for the color calculation, until a color command is received that specifies a second color for a primitive vertex.

In accordance with another aspect of the present invention, a method is provided for identifying a constant color mode of operation in a graphics system having a plurality of geometry accelerators electrically connected in to operate in parallel. In accordance with this aspect of the invention, the method includes the steps of receiving a first color command for a first geometry accelerator and receiving one or more graphic primitives directed to the first geometry accelerator. The method then receives a second color command for a second geometry accelerator and receives one or more graphic primitives directed to the second geometry accelerator. Then, the method again receives one or more graphic primitives to be directed to the first geometry accelerator. Before doing so, however, the method determines whether the first color command is the same as the second color command. If the first color command is the same as the second color command, then the newly received graphic primitives may be sent directly to the first geometry accelerator. If, however, the first and second color commands are not the same, then the method sends a color command to the first geometry accelerator. This color command will cause the first geometry accelerator to reset its internal primitive count, and will not prematurely enter into a constant color or constant alpha mode of operation.

DESCRIPTION OF THE DRAWINGS

The accompanying drawings incorporated in and forming a part of the specification, illustrate several aspects of the present invention, and together with the description serve to explain the principles of the invention. In the drawings:

FIGS. 5A–5E illustrate several of the more complex graphic primitives;

Reference will now be made in detail to the description of the invention as illustrated by the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

DETAILED DESCRIPTION OF THE PREFERRED EMBODIMENT

Figure 1:
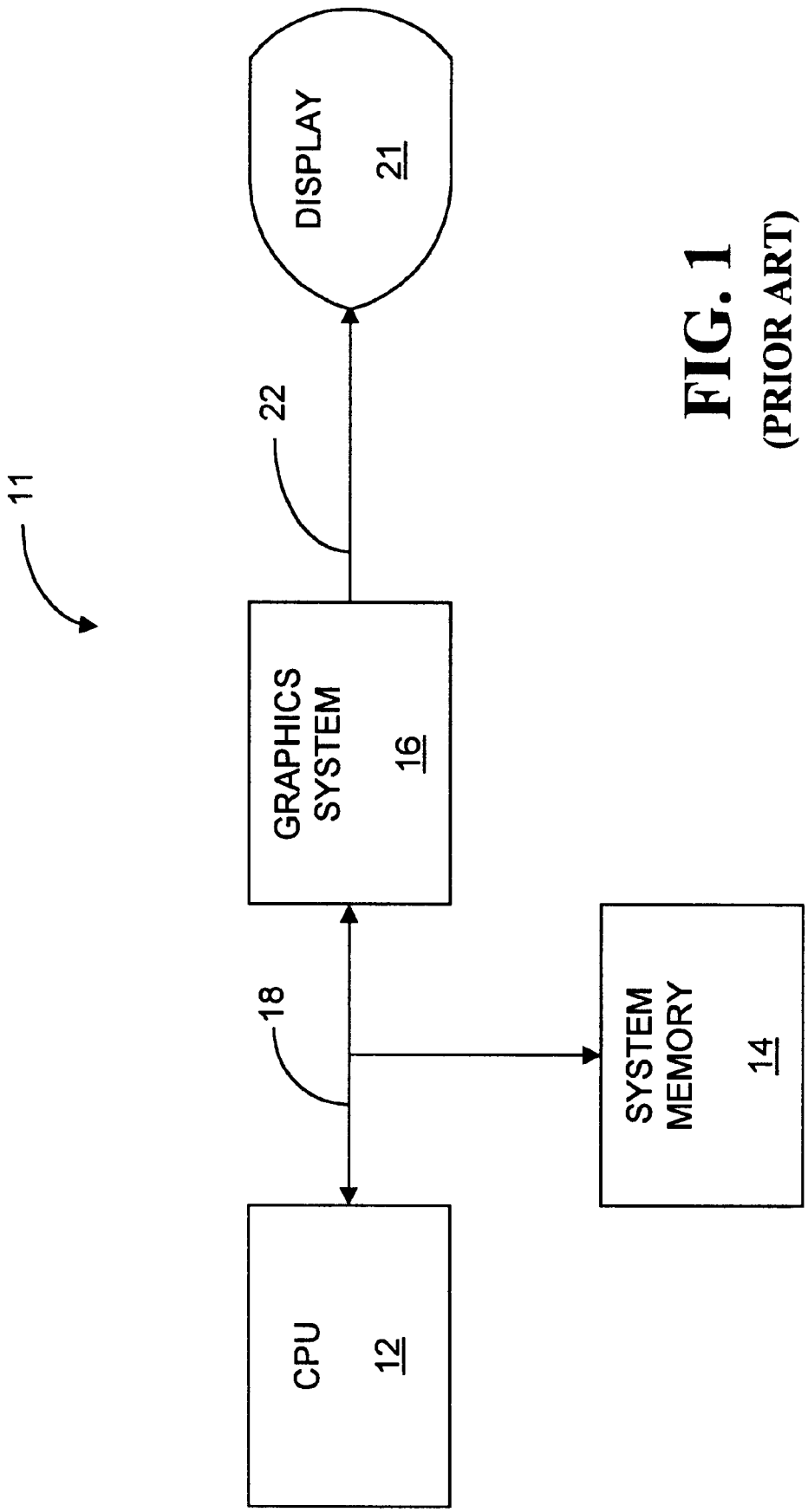
FIG. 1 illustrates a block diagram of a computer graphics system in accordance with the prior art.
Figure 2:
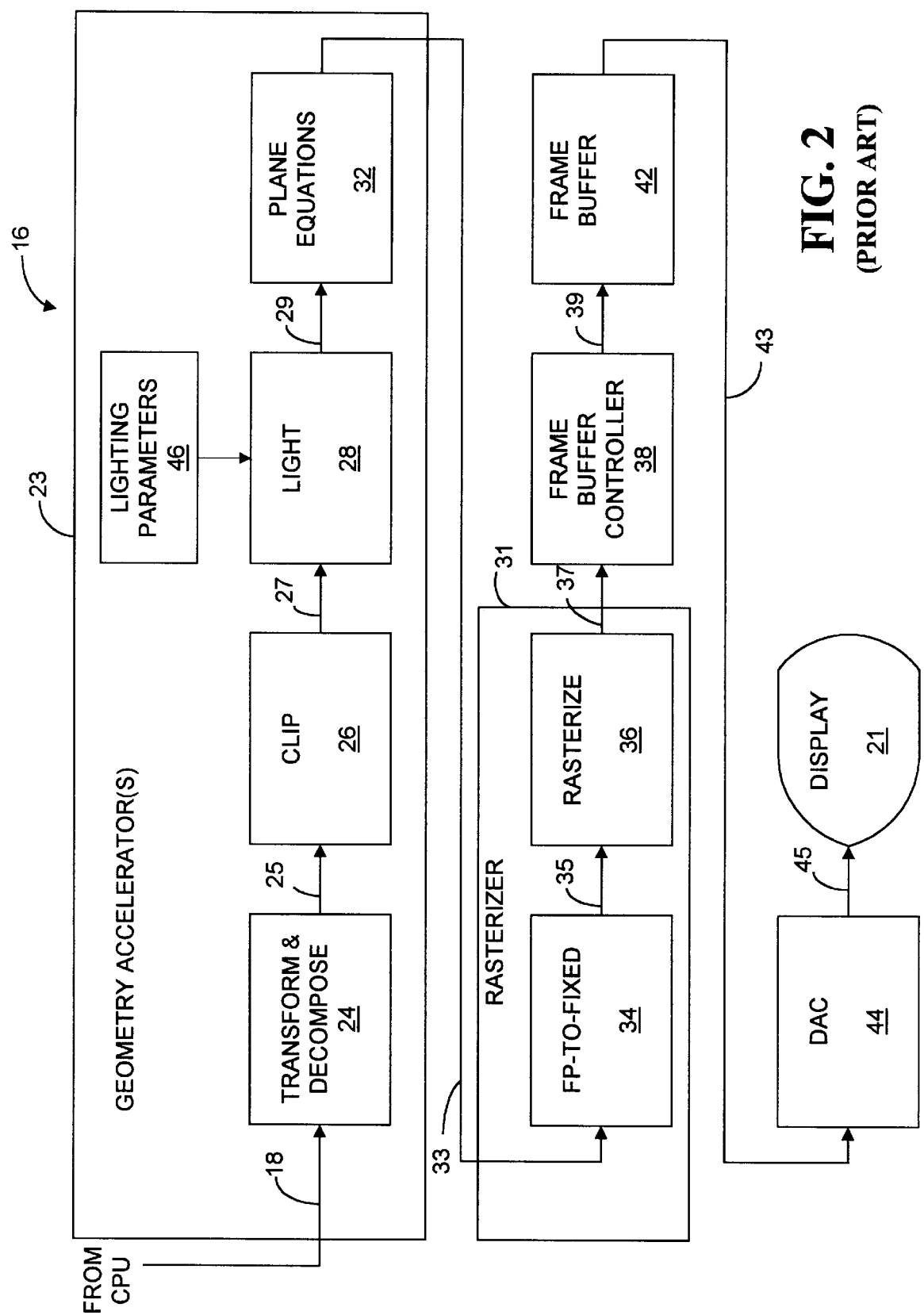
FIG. 2 illustrates a block diagram of a geometry accelerator and rasterizer of a computer graphics system in accordance with the prior art.

The basic components of a conventional computer graphics display system are shown in FIGS. 1 and 2. The computer graphics display system 16 comprises a geometry accelerator 23, a rasterizer 31, a frame buffer controller 38, and a frame buffer 42. The computer graphics display system 16 may also include texture mapping hardware (not shown). The geometry accelerator 23 receives vertex data from the host CPU 12 that defines the primitives (e.g., triangles) that make up the image to be displayed on the display 21.

The geometry accelerator 23 typically includes a transform component 24, which receives vertex data from the CPU 12, a clipping component 26, an illumination or lighting component 28, and a plane equations component 32. The transform and decomposition component 24 performs transformations on the primitive vertex data received from the CPU 12, such as rotation and translation of the image space defined by vertex data. It also performs primitive decomposition, which decomposes multi-sided polygons into triangle (preferably) primitives, as triangle primitives are generally easier to work with than multi-sided polygons. It will be appreciated that, although the transform and decomposition block has been illustrated herein as a single functional block, the transform and decomposition functions may in fact be handled separately.

The clipping component 26 clips the vertex data so that only vertex data relating to primitives that make up the portion of the view that will be seen by the user is kept for further processing. Generally, all other vertex data is tossed or ignored. This is accomplished by determining whether any of the vertex coordinates of the primitive are located outside of the image space that will be seen by the user. If so, the primitive is clipped so that only the vertex data corresponding to the portion of the primitive inside of the image space is kept for further processing.

The illumination component 28, hereinafter referred to as a lighting machine, calculates the final colors of the vertices of the primitives based on the both vertex data and on the locations of the light source(s) and the user relative to the object being displayed. This information is introduced to the lighting machine 28 through lighting parameters 46. While the lighting parameters 46 is illustrated as a separate block, it will be appreciated that this block is preferably implemented by a section of memory dedicated to storing the various lighting parameters (discussed below). The system CPU 12, through software, ultimately conveys the data for these parameters to the graphics accelerator 23 and its memory.

The plane equations component 32 generates floating point equations which define the image space within the vertices on the display screen. That is, the plane equations component 32 determines how to illuminate pixels between the vertices. The floating point equations are converted into fixed point equations by floating point to fixed point component 34 before being rasterized. The rasterizing component 36 of rasterizer 31 and the texture mapping hardware (not shown) generate the final screen coordinates and color data for each pixel in each primitive. The pixel data is stored in a frame buffer 42 for display on a video display screen 21.

Figure 3:
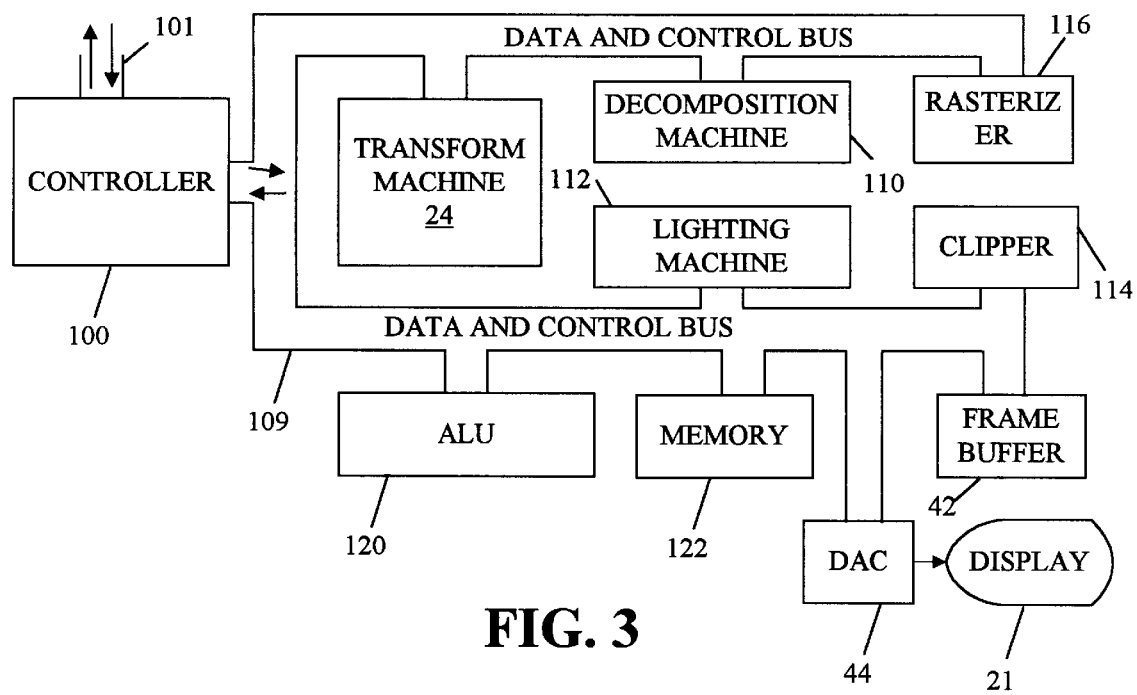
FIG. 3 is a block diagram of the geometry accelerator that illustrates various computational state machines and physical interconnections between the components.

Reference is now made to FIG. 3. While FIG. 2 illustrates a functional block diagram of the principal components in the graphics pipeline, FIG. 3 is a block diagram illustrating a more physical (as opposed to functional) layout of the pipeline. Specifically, the graphics accelerator chip includes a controller 100 that communicates with the CPU 12 (see FIG. 1) across a channel 101. The controller 100 communicates with the various state machines, internal memory 122 arithmetic logic unit (ALU) 120 and other devices by way of a data and control bus 109. More specifically, the transform state machine 24, decomposition state machine 110, lighting state machine 112, and clipper state machine 114 are all in communication with the controller 100 and each other by way of data and control bus 109. FIG. 3 also illustrates that the rasterizer 116, frame buffer 142, and digital to analog converter (DAC) 44 are also in communication across the same bus. It will be appreciated that, consistent with the concepts and teachings of the present invention, these devices may be implemented external to the geometric accelerator chip, and therefore are in communication with the chip via a separate control path.

As stated above, the operations of the geometry accelerator are computationally very intense because of the large volume of data transferred between the host computer and the geometry accelerator and because of the fact the geometry accelerator normally is required to perform several hundred million floating point calculations per second. In accordance with the present invention, it has been determined that the throughput of the computer graphics display system can be improved by reducing the number of mathematical operations that are normally executed in lighting machine and in computing the plane equations. More specifically, it has been determined that the throughput of the computer graphics display system can be improved by eliminating redundancy in the lighting machine 28, and unnecessarily computing plane equations.

In this regard, the lighting machine 28 of the geometry accelerator 23 receives red, green, blue, and alpha (R, G, B and $\alpha$) data, X, Y, and Z data, and $N_x$, $N_y$ and $N_z$ data (orientation data) for each primitive received by the lighting machine. The lighting machine also receives light model material parameters and light source parameters, which are collectively referred to below as lighting parameters or lighting properties. These parameters may be broadly categorized into model material parameters and light source parameters. As will be discussed more fully below, the light model material parameters specify the material of which the model is comprised. The light source parameters specify the location of the light source in 3-D space with respect to the model and the direction of the light. The lighting machine processes all of this data and generates R, G and B color data for each vertex.

In order to support two-sided lighting (i.e., front and back) of models being displayed, the illumination component receives two sets of light model parameters, one for the front-facing primitives and one for the back-facing primitives. Generally, each set of model parameters includes parameters which describe how the material reflects ambient light, diffuse light, and specular light, as well as how the material emits light. Conventional computer graphics display systems require a new set of light model parameters to be sent to the illumination component, along with the R, G, B, and $\alpha$ ($\alpha$ being a transparency indicator) data, the X, Y, and Z data, the $N_x$, $N_y$ and $N_z$ (orientation) data, and S,T,R, and Q (texture coordinates) data, which defines the vertices of the primitive, whenever the primitive being received by the illumination component is facing in a different direction from the previous primitive.

As is known, lighting is an extremely important aspect in computer graphics and imaging. Indeed, it is lighting that gives otherwise two dimensional objects a three dimensional appearance. For example, a circle drawn on a computer screen has a two dimensional appearance. But when the appropriate shading is added to the circle, it takes on the three dimensional, spherical appearance. In computer graphics, an image is displayed by controlling the color of a large number of pixels that make up the display. Lighting properties factor prominently into the determination of the various pixel colors. By way of introduction, computer graphics generally operate to approximate light and lighting conditions by breaking light up into red, green, and blue components. Thus, the color of light sources is characterized by the amount of red, green, and blue light. Likewise, the color of surface materials is characterized by the amount of incoming red, green, and blue components that are reflected in various directions. If all real-world considerations were factored into this process, the computations would be intense, and for all practical purposes, unworkable. However, the lighting equations (discussed below) provides a very workable approximation. It will be appreciated that the lighting equation provided below is implemented in hardware. If a different, or more precise solution is desired, such a solution must be processed or computed in software.

In the lighting model of the preferred embodiment, the light in a particular scene is derived from several light sources that may be individually turned on and off. Some light may come from a particular direction or position, and other light is generally scattered about the scene. For example, if a particular scene is of a room, and a light bulb in that scene is turned on, most of the light in the scene comes from the light bulb, after being reflected off of one, two, or more objects or walls. This reflected light is called ambient light, and is assumed to be so scattered that there is no practical way to tell its original direction. It, nevertheless, disappears if a particular light source is turned off. In addition, there may be a general ambient light present in a scene that comes from no particular source.

In the lighting model of the present invention, light sources have an effect on objects, only when an object's surface absorbs or reflects light. In this regard, an object is assumed to be composed of material with various properties. A material may emit its own light (for example a light bulb), it may scatter some incoming light in all reflections (diffuse component), and it may reflect some portion of incoming light in a particular direction (specular component). With these general considerations in mind, the lighting model of the present invention approximates lighting in a scene to comprise four independent components: emitted, ambient, diffuse, and specular. All four components factor into the lighting equations, which determines the lighting of a particular pixel or primitive vertex.

Having provided this general introduction, which will be readily understood by those skilled in the art, reference is now made in more detail to the portions of the geometry accelerator that are relevant and implemented in the preferred embodiment of the present invention. As discussed in more detail below, the present invention achieves improved efficiency by identifying modes of operation that allow the geometry accelerator to bypass both lighting equation calculations and plane equation calculations. Therefore, the discussion hereinafter will focus on the relevant portions of the system, and those skilled in the art will appreciate that the other system components may operate in accordance with ways that are well known.

Figure 4:
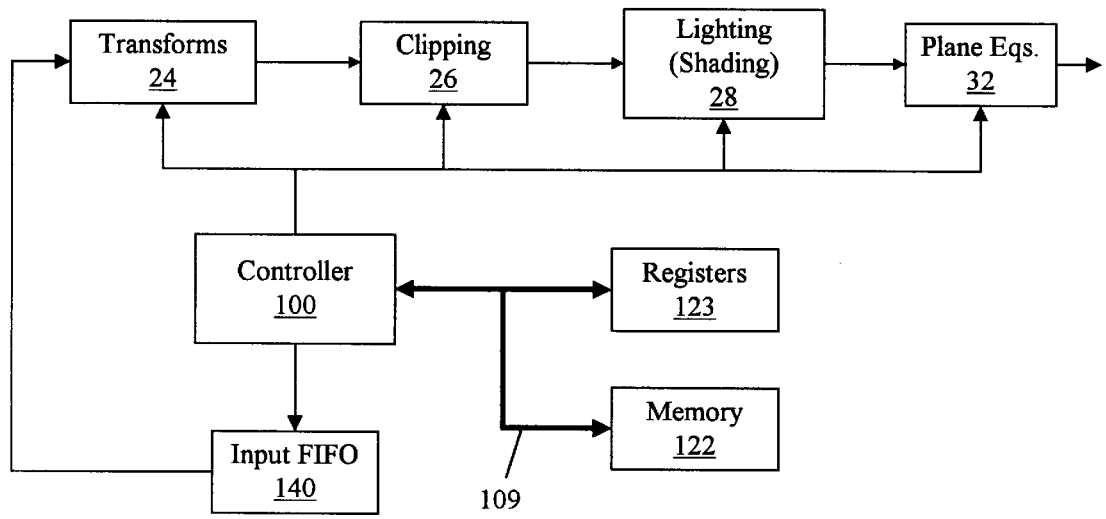
FIG. 4 is a block diagram illustrating the principal functional components of the geometry accelerator constructed in accordance with a preferred embodiment of the present invention.

Reference is made to FIG. 4, which illustrates system components pertinent to the present invention. More particularly, FIG. 4 is block diagram showing the primary components within a geometry accelerator that carries out the functional aspects of one feature of the present invention. As will be discussed in more detail below, in accordance with another feature of the present invention, a plurality of identical graphic accelerators may be interconnected in parallel fashion to achieve greater efficiency and throughput (faster display) in a graphics system. As will be discussed in further detail below, implementation of the multi-chip configuration is more difficult, and warrants special consideration. For ease in understanding, the invention will first be described in connection with a single-chip implementation. This description will then be expanded to address the inventive aspects in a multi-chip system.

In keeping with the description of FIG. 4, the transform 24, clipping 26, lighting (shading) 28, and plane equation 32 state machines are shown. A controller 100 coordinates and controls the operation of each of the individual state machines, as well as performing other management functions of the integrated circuit. In the preferred embodiment, the controller 100 also performs functions of address decoding and state management. A memory 122 and register set 123 are resources that are connected to the controller 100 by way of the control and data bus 109. An input FIFO 140 receives graphic data from an external CPU 12, and feeds this information both to the controller 100 and into the transform state machine 24. While the system generally illustrated in FIGS. 2, 3, and 4 is often referred to as a pipeline, it is appreciated by those skilled in the art that the machines or functions that comprise the pipeline do not necessarily have to be executed for each graphic primitive received. For example, the clipping state machine 26 need not be executed if all of the vertices defining a given graphic primitive are located on the display screen, or if all are located off the display screen, such that no part of the primitive would be visible to a user.

As is known, for a given graphic primitive, the computational processing by each of the state machines within the geometry accelerator need not necessarily be performed. For example, in certain instances the clipping state machine may be bypassed. Suppose three vertices defining a triangular graphic primitive are received and operated upon the transform state machine 24. Further assume that it is determined that each of the vertices defining the triangular primitive would be off the display 21, and therefore not visible to a user. In such an instance, it would be both unnecessary and a waste of resources to perform the various clipping and lighting computations on that graphic primitive. Instead, those routines could be bypassed (as indicated by dashed lines 150), and the primitive could be passed on down the pipeline for any further, relevant processing. Otherwise, a new primitive could be read in from the CPU, and operated on accordingly.

Similarly, the lighting 28 and plane equation 32 state machines need not always be executed. As previously described, the lighting machine 28 operates to compute the color a given vertex based upon lighting conditions and material properties. In the lighting equation utilized by the preferred embodiment, this involves relatively time consuming calculations. Likewise, the plane equation machine 32 conceptually operates to compute the slopes between the vertices to produce plane equations for triangles or slopes for lines of a graphic primitive. If, however, vertices of a given primitive are identically colored, the slope (color slope, or gradient) between the vertices will be zero, and therefore no computations need be performed by the plane equation machine 32. While this summarizes the basic conceptual operation, it is recognized that those skilled in the art will appreciate the particular mathematical operations and equations required for carrying out the actual computations, and therefore such will not be described herein.

Accordingly, based upon decisions made by the controller 100 from an examination of data received and transmitted through the input FIFO 140, one or more of the state machines within the graphics pipeline may be bypassed in order to expedite the processing on a given primitive, and therefore speed up the operation of the system.

In accordance with the present invention, another way of speeding up the pipeline processing is by recognizing situations in which the computations of the lighting machine 28 and the plane equations machine 32 may be bypassed. This functionality is achieved by configuring the controller 100 to recognize conditions referred to as constant color and constant alpha. The constant color condition is recognized when, in rendering a portion of the graphics display, the system processes a number of graphic primitives, all of the same color. This condition is frequently encountered. As will be appreciated by those skilled in the art, a given object is often of uniform color, and is defined (graphically) by hundreds, if not thousands, of graphic primitives. That is, that object is decomposed into a large number of primitives (preferably triangles), which are then processed by the graphics system, and more particularly the graphics pipeline.

The present invention operates to sense or recognize when, after identifying several consecutive graphics primitives, or vertices, of equal color, that the system has entered into a constant color mode. Similarly, in accordance with another aspect of the present invention, a constant alpha mode is identified. Like the constant color mode, the constant alpha mode greatly reduces the computations that the lighting 28 and plane equation 32 machines of the graphic pipeline need to make in order to process the graphic primitive data for output to the rasterizer. As is known, alpha is a blending factor that is related to an object's transparency. For example, if the system is processing the image of an automobile, the windows of the automobile will have a transparency factor $\alpha$, wherein the color of the window will be blended with the color of the objects in the background before being displayed. When in constant $\alpha$ mode and $\alpha=1$ (no transparency), then a tremendous time saving is achieved, because no blending with background objects need be performed. Even when $\alpha$ is not 1, but nevertheless constant, efficiencies are realized because of savings and the time required to copy $\alpha$ data over to the plane equation 32 state machine. In the architecture of the preferred embodiment, it takes approximately 10 states just for the shading or lighting state machine 28 to copy $\alpha$ data into the plane equation state machine 32.

Having illustrated the basic architecture of the present invention, reference is now made to FIGS. 5A–5G to better illustrate the identification of the constant color and constant $\alpha$ modes. A variety of graphic primitive types are well known. Some of the more complex graphic primitives are illustrated in FIGS. 5A–5E and briefly described in Table 1 below.

TABLE 1

| Primitive Type | Mapping | Description |
| --- | --- | --- |
| point | point | 1 vertex-draws 1 pixel on the screen |
| line | vector | Two vertices-draws a line between the 2 vertices. |
| line loop | vector | n vertices-draws a line between $V_0$ and $V_1$, then $v_1$ to $V_2, \ldots, V_{n-1}$ to $V_n$, to $V_0$ (one vertex shared from the last vector until the last vector for which the last vertex is combined with the first vertex is to close off the loop) |

TABLE 1-continued

| Primitive Type | Mapping | Description |
| --- | --- | --- |
| line strip | vector | n vertices-draws a line between $V_0$ and $V_1$ then $V_1$ to $V_2, \ldots, V_{n-1}$ to $V_n$ (one vertex shared from the last vector) |
| triangle | triangle | 3 vertices-draws a triangle using the 3 vertices. |
| triangle fan | triangle | n vertices-draws a triangle after the first three vertices then another triangle for each additional vertex. The first vertex, $V_0$, is shared with all triangles and the last vertex sent is common to the next triangle as well. Draws n – 2 triangles. |
| triangle strip | triangle | n vertices-draws a triangle after the first 3 vertices then another triangle for each additional vertex. The last 2 vertices sent are combined with the next vertex sent to form the 3 vertices of the triangle. Draws n – 2 triangles. |
| quad | quad | 4 vertices-draws a quadrilateral (2 triangles) |
| quad mesh | quad | n vertices-draws a quad after the first 4 vertices then every 2 vertices draws another quad by combining the 2 new vertices with the last 2 vertices sent. Draws (n/2) – 1 quads. |
| Polygon | triangle | Implemented just like the triangle fan for this purpose. |

In accordance with the preferred embodiment of the present invention, the system counts four primitives before entering into the constant $\alpha$ or constant color mode. It has been found that, with one exception, this implementation works with all primitive types, even the more complex primitive types. The one exception relates to the triangle fan or polygon primitive, and will be discussed in connection with FIG. 5G.

Figure 5F:
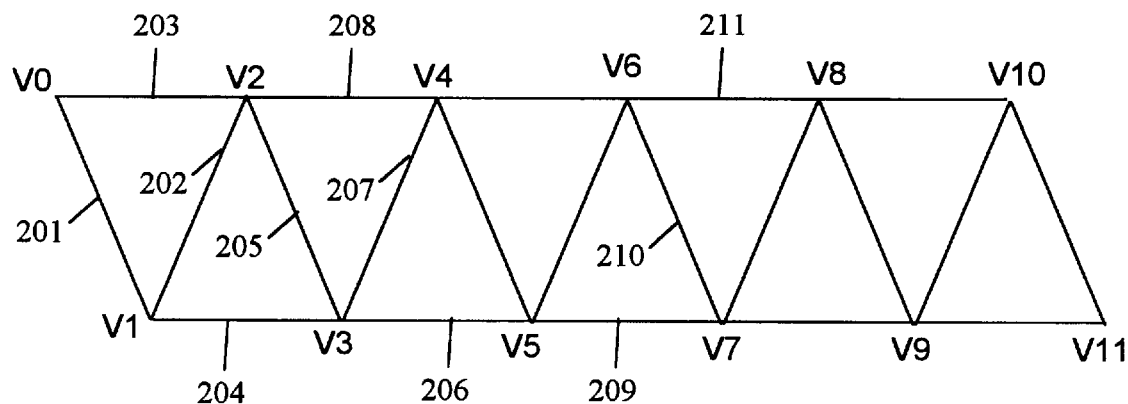
FIG. 5F illustrates a triangle strip graphic primitive type.

Reference will first be made to FIG. 5F, which illustrates the implementation of the invention in connection with a triangle strip graphic primitive. Furthermore, it will be appreciated that the discussion hereinafter, unless otherwise specifically stated to the alternative, will be directed to both constant color and constant alpha modes. Indeed, the implementation of both is identical for a single-chip implementation. Therefore, the per-chip architecture is the same. The difference in handling the constant alpha versus the constant color modes of operation arises in the multi-chip configuration which will be discussed in more detail below. FIG. 5F helps describe the identification of the constant color and constant alpha modes in connection with a triangle strip graphic primitive. As is known, when drawing a triangle strip primitive configuration, after the first three vertices are drawn to define the first triangle, each subsequent triangle is defined by the addition of a single vertex. For example, vertices 0, 1 and 2 define the first triangle of the triangle strip configuration. Vertex 3, then defines the second triangle of the primitive—that triangle being the triangle defined by vertices 1, 2 and 3. For purposes of illustration, suppose vertex 0 is red, and vertices 1, 2, 3, 4, 5, and 6 are all green (identically colored). The following code segment illustrates a typical open GL code segment, which may be used to draw the primitive of FIG. 5F.

```
glBegin (GL_TRIANGLE_STRIP);        /* start a triangle strip*/
    glColor3 (1.0,0,0,0.0);         /*red=1,green=0,blue=0,alpha=1 */
    glVertex3 (X,Y,Z);              /*Vertex 0, x, y, and z coordinates */
    gllColor3 (0.0,1.0,0.0);        /*red=0,green=1,blue=0,alpha=1 */
    glVertex3 (X,Y,Z);              /* Vertex 1, x, y, and z coordinates */
    glVertex3 (X,Y,Z);              /* Vertex 2, x, y, and z coordinates */
    glVertex3 (X,Y,Z);              /* Vertex 3, x, y, and z coordinates */
    glVertex3 (X,Y,Z);              /* Vertex 4, x, y, and z coordinates */
    glVertex3 (X,Y,Z);              /* Vertex 5, x, y, and z coordinates */
    glVertex3 (X,Y,Z);              /* Vertex 6, x, y, and z coordinates */
    gllColor3 (0.0,0.0,1.0);        /*red=0,green=0,blue=1,alpha=1 */
    glVertex3 (X,Y,Z);              /* Vertex 7, x, y, and z coordinates */
    glVertex3 (X,Y,Z);              /* Vertex 8, x, y, and z coordinates */
    glVertex3 (X,Y,Z);              /* Vertex 9, x, y, and z coordinates */
glEnd();
```

Since no new color command (glColor3 or glColor4) was received between vertices 1 and 2, the invention will begin counting, with the graphic primitive defined by vertices 0, 1, and 2 as being the first primitive received. Thereafter, vertex 3 will define the second primitive received, and vertex 4 will define the third primitive received. After vertex 4 is received, the invention may enter into the constant color mode. To better appreciate this, it will be understood that line segments 201, and 203 both have slope information, and therefore must be operated upon by the plane equation state machine 32. Line segments 201 and 203 both include slope information translating between vertex 0, which is red, and vertices 1 and 2, which are both green. The remaining line segments have 0 slope information, and therefore need not be processed by the plane equation state machine 32. Upon the transmission of vertex 7, however, the vertex color changes from green to blue. Therefore, line segments 209, 210, and 211 all contain slope information and therefore must be processed by the plane equations state machine 32.

It will be appreciated that, pursuant to a similar analysis, each of the various graphic primitives may be analyzed and processed in the same manner, with the exception of the triangle fan or polygon, which will be discussed below. That is, the present invention may detect a constant color and constant alpha mode of operation by counting a predetermined number of vertices, since receiving the last color command. In the preferred embodiment, the invention counts a predetermined number (four) of primitives rather than vertices. This choice was made purely for reasons of design implementation with existing hardware. Consistent with the concepts and teachings of the present invention, a system could count vertices as well.

Figure 5G:
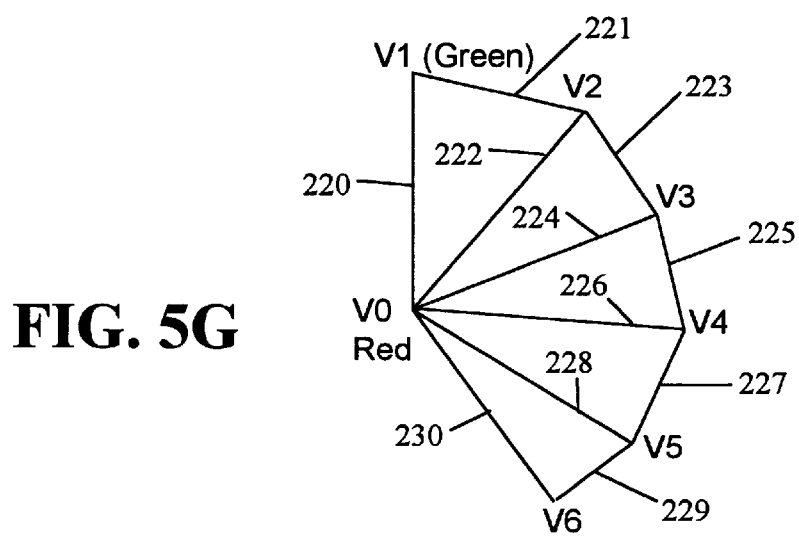
FIG. 5G illustrates a triangle fan graphic primitive type.

Referring now to FIG. 5G, the difficulty in the special case of a triangle fan primitive is illustrated. Again assuming that vertex 0 is red, and vertices 1, 2, 3, 4, 5 and 6 are all green, even though a number of constant color vertices have been received, the system may not enter into the constant color or constant alpha modes. The reason for this is that, since the central vertex 0 is a different color than all of the ancillary vertices, there is always slope information on the interconnecting line segments (line segments 220, 222, 224, 226, 228, 230). The preferred embodiment of the present invention deals with this situation by setting a condition code flag or a bit that inhibits the invention from entering into the constant color or constant alpha mode. This bit is set only when the graphic primitive is a triangle fan (or polygon) type, and the central vertex has a central color or α value that is different than the ancillary vertices.

As previously mentioned, for a single-chip configuration, the constant alpha and constant color modes are handled similarly. In OpenGL there are two color commands. The first is "glColor3 (R,G.B)" and "glColor4 (R,G,B,α)." Any time a color command is received, whether it be a glColor3 or a glColor4 command, the preferred embodiment of the present invention resets the vertices, or primitive counter. In the preferred embodiment this counter comprises a two bit register or memory location that is incremented each time a primitive, or alternatively a vertex, is received. The register or memory location is reset to 0 each time a color command is received.

Constant alpha mode is treated similarly. However, the two bit register or memory location for counting α values is reset only in two situations. The first is upon receipt of a glColor4 command, and the second is upon receiving the first glColor3 command, following a glColor4 command. As is known, in a glColor3 command, the α value defaults to the value of 1 (no transparency). Therefore, multiple glColor3 commands may be received, and the system may assume a constant α value of 1. Therefore, there is no need to reset the count for the constant α mode. However, since a glColor4 command may (and typically does) assign a α value other than 1, the reception of the first glColor3 command following a glColor4 command is presumed to define a differing α value. Therefore, the α counter is reset. In accordance with an alternative embodiment, it will be appreciated that the system could be configured to evaluate the actual color and α values submitted with each glColor3 and glColor4 command. If two successive commands defined the same colors (or α value) the system could ignore the second color command, without resetting the constant color count. For purposes of simplifying the hardware, however, it is assumed that programmers will not provide redundant color commands, and therefore optimize the code to achieve the benefits of the present invention.

Figure 6:
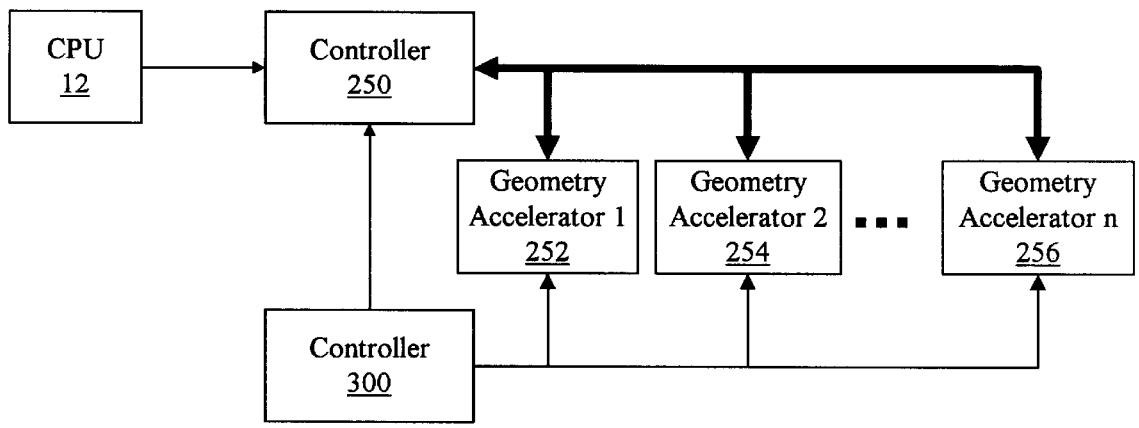
FIG. 6 is a top-level block diagram illustrating a system having a plurality of parallel-connected geometry accelerator chips.

Referring now to FIG. 6, a block diagram is shown which depicts the parallel configuration of geometry accelerator chips, each of which implements the constant color and constant alpha modes of the present invention. The diagram of FIG. 6 illustrates a CPU 12 communicating with a memory 250 and multiple geometry accelerator chips 252, 254, and 256 that are in communication with the memory 250 across a common data bus 260. A controller 300 is in communication with the memory 250, and each of the geometry accelerator chips to control and coordinate their operation. This figure represents a very top-level view, as those skilled in the art will appreciate how to implement the specific hardware for electrically connecting multiple geometry accelerator chips 252, 254, 256 in parallel configuration. The significant aspect is that when the CPU 12 submits a large amount of graphic primitives to the memory 250, a portion of these primitives may be allocated between and among the plurality of geometry accelerators 252, 254, and 256.

To very simply illustrate one of the complications that arise in a multi-chip embodiment, assume that there are two geometry accelerators 252 and 254. Further assume (somewhat unrealistically) that every other graphic primitive submitted from the memory 250 to the geometry accelerators is submitted to each of the geometry accelerators 252 and 254. In this regard, the first, third, fifth, etc. graphic primitives are submitted to graphic geometry accelerator 252, while the second, fourth, sixth, etc. graphic primitives are submitted to graphic geometry accelerator 254. Further assume that all of the even numbered graphic primitives are red, while all of the odd number graphic primitives are blue. It would be appreciated from the description presented above, that without further control mechanisms, each of the geometry accelerator chips would enter a constant color mode, one recognizing the constant color of red, and the other recognizing the constant color of blue. As a result, the lighting and plane equation computations would be bypassed. In fact, such equations should be processed since, in reality, the colors are constantly changing between every other graphic primitive. As a result, the output display would be greatly distorted.

While the foregoing example is unrealistic in practice, it nevertheless illustrates a problem that needs to be addressed at the board or system level. Specifically, the controller 300 must implement measures to provide appropriate instructions for the various geometry accelerator chips when apportioning blocks of data (graphic primitives) among the various chips. The problem illustrated above is further complicated by the fact that OpenGL supports both glColor3, and glColor4 commands. Therefore, added safeguards and controls need to be implemented for effecting the constant alpha mode of operation in a multi-geometry accelerator configuration.

To illustrate one way that this problem may arise, consider the following OpenGL code segment:

```
glBegin(GL_TRIANGLE_STRIP);
        Begin sending data to first accelerator glColor3(1.0,0.0,0.0);              /*alpha implied 1.0*/
    glVertex3f(X0,Y0,Z0);
    glVertex3f(X1,Y1,Z1);
    glVertex3f(X2,Y2,Z2);
    ...                                 /*more vertex commands*/
    glVertex3f(X8,Y8,Z8);
        Begin sending data to second accelerator glVertex3f(X9,Y9,Z9);
    glColor4f(0.0,1.0,0.0,0.5);         /*alpha set to 0.5*/
    glVertex3f(X10,Y10,Z10);
    glColor3f(0.0,0.0,1.0);             /*alpha implied 1.0*/
    glVertex3f(X11,Y11,Z11);
    glVertex3f(X12,Y12,Z12);
        Begin sending data back to first accelerator glVertex3f(X13,Y13,Z13);
glEnd();
```

Looking at the above-listed OpenGL code segment (including comments), the segment begins by sending to a first geometry accelerator a glColor3 command, followed by nine vertices. Since the segment is defining/drawing a triangle strip, it is understood that upon sending the sixth vertex, four graphic primitives have been sent and the first geometry accelerator enters both constant color and constant alpha modes of operation. Under the control of a chip/device external to the geometry accelerator, after transmitting the ninth vertex (glVertex3(X8,Y8,Z8)) to the first geometry accelerator, the external device begins sending vertices to a second geometry accelerator. During this segment of code, a glColor4 and a glColor3 command are both transmitted to the second geometry accelerator. The second geometry accelerator does not enter either the constant color or constant alpha mode of operation, since it does not receive a sufficient number of consecutive vertices.

Upon the fourteenth vertex (glVertex3(X13,Y13,Z13)), the external device again begins to send vertices back to the first geometry accelerator. Without further guidance, the first geometry accelerator sees the ninth vertex immediately followed by the fourteenth vertex, and would assume that it is still in constant color and constant alpha modes of operation, when in fact the intervening data takes the system out of these modes. If left to remain in the constant color or constant alpha mode, the first geometry accelerator would not process all the necessary plane equations and the information passed from the first geometry accelerator to downstream hardware would be inaccurate and result in an inaccurate or distorted resulting display.

This problem is addressed in part by the upstream hardware (the external device), that apportions segments of code among the multiple geometry accelerators, inserting into the code a command that informs the geometry accelerator that data/code is being sent to another geometry accelerator. In the illustrated embodiment, this is realized by an EOC (end of code) command. Also, when redirecting data/code to a new geometry accelerator, the external device transmits to the new geometry accelerator the last color command sent to the previous geometry accelerator along with any shared vertices of the graphic primitive. In the example of a triangle_strip, there are two shared vertices, so the last two vertices transmitted to the previous geometry accelerator will be retransmitted to the new geometry accelerator.

In view of the foregoing, it will be appreciated that the code seen by each of the geometry accelerators is as follows:

```
                    Accelerator #1 Code:

glBegin(GL_TRIANGLE_STRIP);
    glColor3(1.0,0.0,0.0);              /*alpha implied 1.0*/
    glVertex3f(X0,Y0,Z0);
    glVertex3f(X1,Y1,Z1);
    glVertex3f(X2,Y2,Z2);
    ...                                 /*more vertex commands*/
    glVertex3f(X8,Y8,Z8);
    EOC
    glColor3f(0.0,0.0,1.0);             /*alpha implied 1.0*/
    glVertex3f(X11,Y11,Z11);
    glVertex3f(X12,Y12,Z12);
    glVertex3f(X13,Y13,Z13);
glEnd();
```

```
                    Accelerator #2 Code:

glBegin(GL_TRIANGLE_STRIP);
    glColor3f(0.0,0.0,1.0);             /*alpha implied 1.0*/
    glVertex3(X7,Y7,Z7);
    glVertex3f(X8,Y8,Z8);
    glVertex3f(X9,Y9,Z9);
    glColor4f(0.0,1.0,0.0,0.5);         /*alpha set to 0.5*/
    glVertex3f(X10,Y10,Z10);
```

-continued

Accelerator #2 Code:

```
glVertex3f(X11,Y11,Z11);
glVertex3f(X12,Y12,Z12);
EOC
glEnd();
```

Generally, the upstream hardware is sophisticated enough to recognize when a large block of data is transmitted following a given color command, so that when continuing primitive data is routed to multiple geometry accelerator chips, then back to a first chip, the upstream hardware need not retransmit the color command back to the first geometry accelerator. The constant alpha mode presents a special case, which must be addressed. In this regard, the geometry accelerator of the preferred embodiment is designed to insert slope data into its output for the hardware downstream of the geometry accelerator. More specifically, the geometry accelerator will output slope information for alpha upon receiving an EOC command, if it is not in constant alpha mode, and if the last color command received was a glColor3 command (see FIG. 7B). In this regard, the geometry accelerator output seen by the downstream hardware is as follows:

primitive 1 color/alpha slope info.
primitive 1 X,Y,Z slope info./render primitive
primitive 2 color/alpha slope info.
primitive 2 X,Y,Z slope info./render primitive
primitive 3 color/alpha start info. slopes=0.0
primitive 3 X,Y,Z slope info./render primitive
primitive 4 X,Y,Z slope info./render primitive
primitive 5 X,Y,Z slope info./render primitive
primitive 6 X,Y,Z slope info./render primitive
primitive 7 X,Y,Z slope info./render primitive
primitive 8 color/alpha slope info.
primitive 8 X,Y,Z slope info./render primitive
primitive 9 color/alpha slope info.
primitive 9 X,Y,Z slope info./render primitive
primitive 10 color/alpha slope info.
primitive 10 X,Y,Z slope info./render primitive
primitive 11 color/alpha slope info.
primitive 11 X,Y,Z slope info./render primitive
alpha start=1.0, alpha slope=0.0
primitive 12 color slope info.
primitive 12 X,Y,Z slope info./render primitive As is seen, the geometry accelerators output to the downstream hardware color and alpha slope information for each primitive. However, once in the constant color and constant alpha modes of operation, they output only slope information (see primitives 4, 5, 6, and 7). When, however, the second geometry accelerator processes its EOC command, indicating that the next portion of the data will be sent to another geometry accelerator, it sends alpha start and slope data to the downstream hardware, reflecting the fact that it is not in constant alpha mode (see the data between primitives 11 and 12).

Figure 7A:
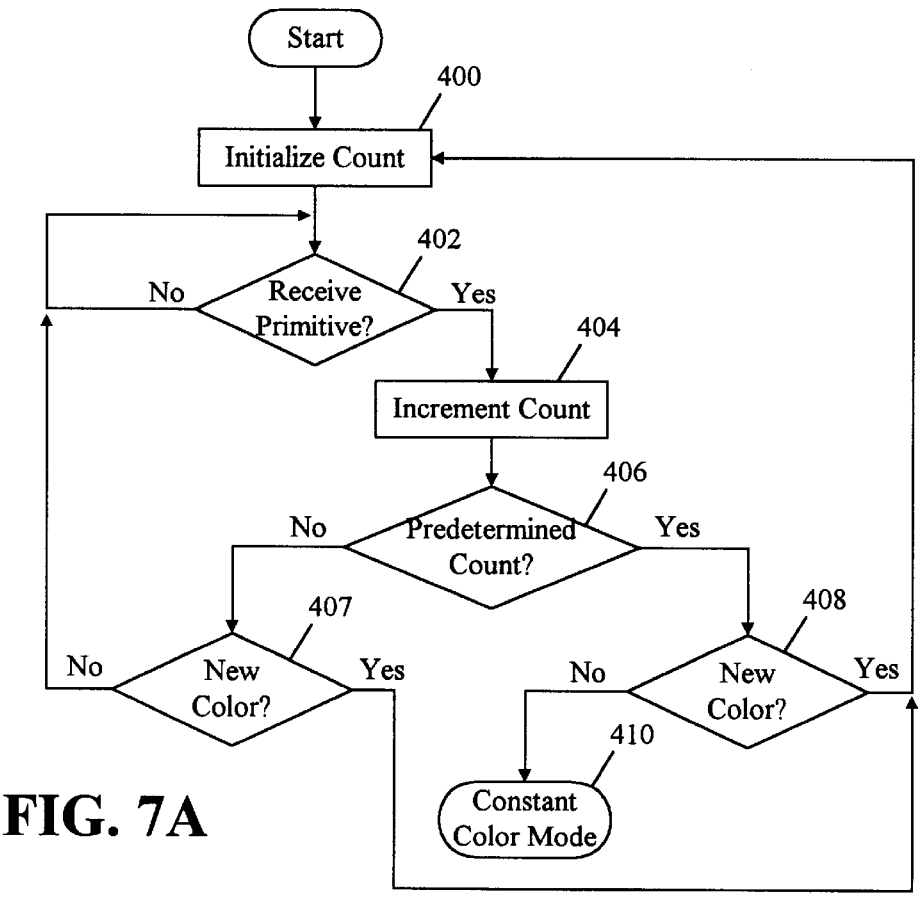
FIG. 7A is a top-level software flowchart illustrating the primary operational steps executed in a geometry accelerator for entering a constant color mode.
Figure 7B:
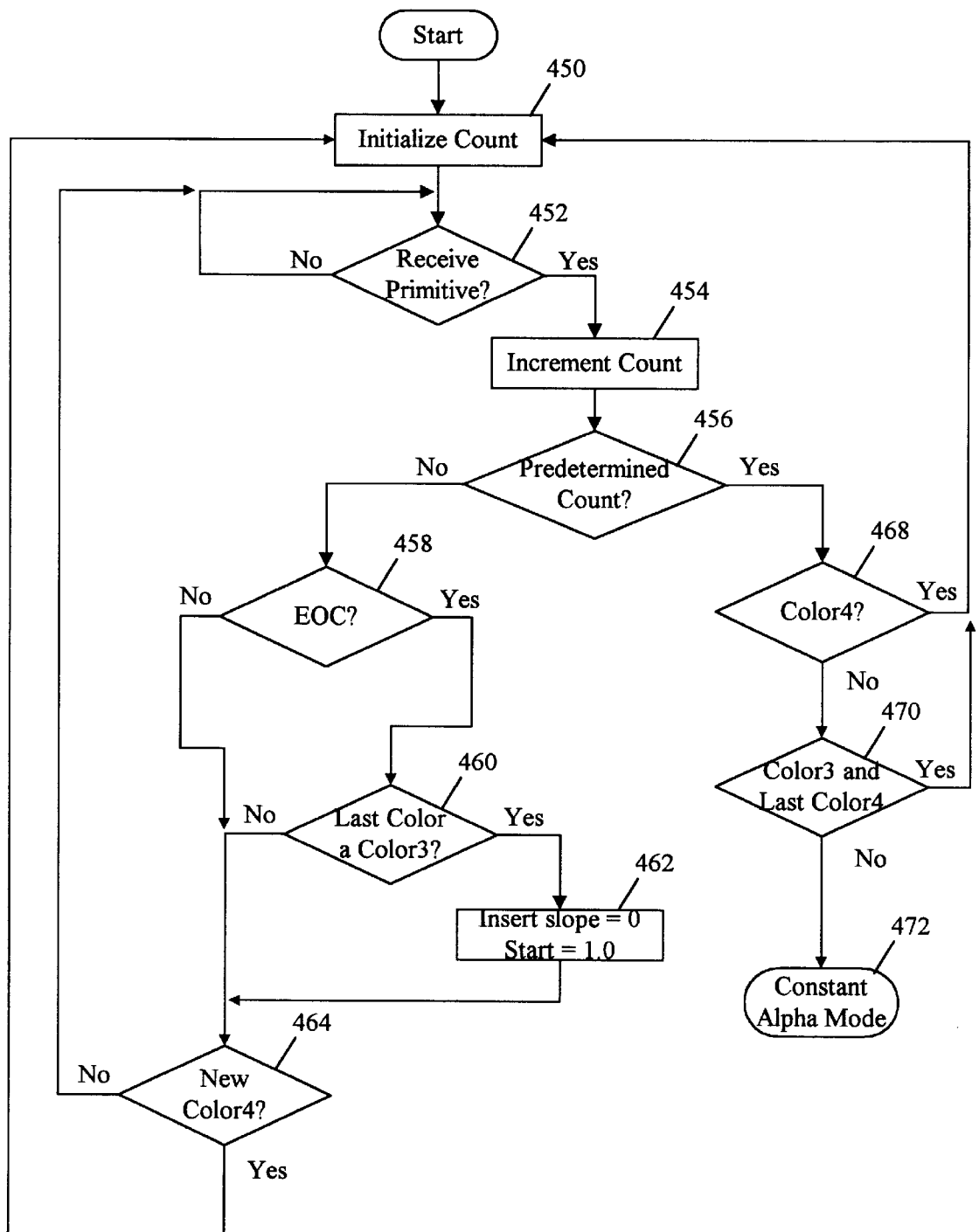
FIG. 7B is a top-level software flowchart illustrating the primary operational steps executed in a geometry accelerator for entering a constant alpha mode.

Reference is now made to FIGS. 7A and 7B, which are flowcharts illustrating the top-level operation of the constant color and constant alpha modes (respectively) of operation in a geometry accelerator constructed in accordance with the present invention. Turning first to FIG. 7A, at the initial power up, the geometry accelerator initializes the count in the constant color count register (step 400). It then waits (at step 402) to receive a graphic primitive from a CPU. Once a primitive is received, the system increments the count of the constant color count register (step 404). It then checks to determine whether the count in this register exceeds a predetermined count (step 406). In a preferred embodiment, this predetermined count is a count of four. However, as will be understood by those skilled in the art, this count may be varied, depending upon the particular primitive (e.g., line segments, line strip, triangle, triangle strip, triangle fan) being drawn. Regardless of whether the predetermined count has been exceeded or not, the system will check (steps 407 and 408) to see if a new color command has been received (glColor3 or glColor4). If so, it will return to step 400 and reinitialize the count register value. Otherwise, if the predetermined count has not been exceeded, the system will return to step 402 and wait to receive the next graphic primitive. If, however, the predetermined count has been exceeded, and no new color command has been received, then the system will enter into the constant color mode (step 410). In this mode, the lighting machine and plane equation machine color computations are avoided.

It will be appreciated that the top level description presented above applies equally to the determination of the constant α mode of operation as well. Separate count registers are provided for each constant color count and constant α count, as previously described. It will be further appreciated that other mechanisms (other than count registers) for counting the primitive data may be provided consistent with the concepts and teachings of the present invention.

In specific regard to the detection of the constant α mode of operation, reference is now made to FIG. 7B. Like the constant color detection, at the initial power up, the geometry accelerator initializes the count in the constant α count register (step 450). It then waits (at step 452) to receive a graphic primitive from a CPU. Once a primitive is received, the system increments the count of the constant α count register (step 454). It then checks to determine whether the count in this register exceeds a predetermined count (step 456). In a preferred embodiment, this predetermined count is a count of four. However, as will be understood by those skilled in the art, this count may be varied, depending upon the particular primitive (e.g., line segments, line strip, triangle, triangle strip, triangle fan) being drawn.

If the predetermined count has not been reached, the geometry accelerator checks (step 458) to see if an EOC command has been inserted. If not, then the geometry accelerator checks to see if a new glColor4 command has been sent (step 464), and if so, it reinitializes the α count register. Otherwise, it retrieves the next primitive. If, however, an EOC command has been received (at step 458), then the geometry accelerator checks (at step 460) to see of the last color command received was a glColor3 command. If not, it returns to step 464. If so, then it inserts a "slope=0 and Start=1.0" for the downstream hardware.

If, at step 456, the predetermined count has been reached, then the geometry accelerator ensures (at step 468) that a new glColor4 command has not been received. If one has, then it reinitializes the α count register (step 450). Otherwise, it determines whether the α value has changed, by detecting a glColor3 command following a glColor4 command (step 470). If step 470 resolves to false, then the geometry accelerator enters into the constant α mode (step 472).

The description presented in connection with FIGS. 7A and 7B, illustrate the conceptual operation of the preferred embodiment. However, it is noted that the preferred embodiment of the present invention also handles the special case when the operative primitive is a triangle fan or polygon. In short, when the operative primitive is a triangle fan or polygon, and the colors of the vertices (which would otherwise allow the system to enter a constant color mode) are different than the color of the V0 vertex, then the system will not enter a constant color mode. The reason is that slope data must be computed between the central vertex (V0) and each subsequent vertex. It will be appreciated that the requisite logic for handling this special case is easily incorporated into FIGS. 7A and 7B, but has been omitted for purposes of illustrated the inventive concept of the present invention.

It will be appreciated that the particular approach selected will, as always, be dictated by design and implementation tradeoffs. The more simplistic approaches generally realize savings in hardware, but often sacrifice some measure of performance. Since the present invention is directed to the broad concept of functionality of recognizing and entering a constant color and constant α mode of operation, the particular details of various implementations need not be described herein, as they will be appreciated and realizable by those of ordinary skill in the art.

While the foregoing has given a basic description of image generation and primitive manipulation in a graphics accelerator, it should be appreciated that many areas have been touched upon only briefly. A more complete and detailed understanding will be appreciated by those skilled in the art, and is accessible from readily-available sources. For example, the graphics accelerator of the presently preferred embodiment is designed for operation in systems that employ OpenGL, which is a well known graphics application program interface (API). Indeed, there are many references which provide a more detailed understanding of graphics generally, and OpenGL specifically. One such reference is entitled OpenGL Programming Guide, by OpenGL Architecture Review Board—Jackie Neider, Tom Davis, and Mason Woo, an Addison-Wesley Publishing Company, 1993, which is hereby incorporated by reference.

As a final note, the preferred embodiment of the present invention is implemented in a custom integrated circuit, which serves as a single-chip geometry and lighting assist for a focused set of 3D primitives. Although the discussion above has focused upon triangle primitives, the chip performs geometric transformation, lighting, depth cue, and clipping calculations for quadrilaterals, triangles, and vectors. This chip receives modeling coordinate polygon and vector vertices from a host CPU 12, transforms vertex coordinates into screen space, determines vertex colors, decomposes quadrilaterals into triangles, and computes the triangle plane equations. It also performs 3D view clipping on the transformed primitives before sending the resulting triangles and vectors to a scan converter for rendering.

This custom integrated circuit supports many combinations of primitives and features, but as will be appreciated, when an application program uses an unusual feature, much of the computational work falls back on the host software. In those cases, the graphics pipeline is implemented in software and commands for the scan converter are passed through the custom integrated circuit. Alternatively, the software may supply device coordinate primitives to the custom integrated circuit to take advantage of its internal hardware that performs the plane equation work for the downstream scan conversion hardware.

The foregoing description has been presented for purposes of illustration and description. It is not intended to be exhaustive or to limit the invention to the precise forms disclosed. Obvious modifications or variations are possible in light of the above teachings. The embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. A method for enhancing the performance of a geometry accelerator comprising the steps of:
    (a) receiving a color command from an application program interface (API), the color command identifying a first color for a primitive vertex;
    (b) initializing a count;
    (c) receiving a primitive element to draw on a screen in the first color;
    (d) incrementing the count;
    (e) operating on the primitive element by a lighting machine and a plane equation machine;
    (f) repeating (c), (d), and (e) until a specified count has been reached; and
    (g) once the specified count has been reached, repeating step (c) but not (e) until a color command is received that specifies a second color for a primitive vertex.

2. The method as defined in claim 1, wherein the primitive element is a multi-vertex graphic primitive.

3. The method as defined in claim 1, wherein the primitive element is a single vertex graphic primitive.

4. The method as defined in claim 1, wherein the specified count is four.

5. The method as defined in claim 1, wherein the color command specifies red, green, and blue color components.

6. The method as defined in claim 5, wherein the color command specifies red, green, blue, and alpha color components, where alpha is an indicia of transparency.

7. A computer readable storage medium containing program code for controlling a method for enhancing the performance of a geometry accelerator comprising the steps of:
    (a) receiving a color command from an application program interface (API), the color command identifying a first color for a primitive vertex;
    (b) initializing a count;
    (c) receiving a primitive element to draw on a screen in the first color;
    (d) incrementing the count;
    (e) operating on the primitive element by a lighting machine and a plane equation machine;
    (f) repeating (c), (d), and (e) until a specified count has been reached; and
    (g) once the specified count has been reached, repeating step (c) but not (e) until a color command is received that specifies a second color for a primitive vertex.

8. An improved geometry accelerator comprising:
    (a) first receiving means for receiving a color command from an application program interface (API), the color command identifying a first color for a primitive vertex;
    (b) initializing means for initializing a count;
    (c) second receiving means for receiving a primitive element to draw on a screen in the first color;

(d) incrementing means for incrementing the count; and (e) means responsive to the count for controllably operating on the primitive element by a lighting machine and a plane equation machine, the means being operative to control the lighting machine and plane equation machine to operate on the primitive element if the count is less than a specified value, and to bypass the operations of the lighting machine and the plane equation machine if the count is greater than a specified value.

* * * * *